(12) United States Patent
Ogawa

(10) Patent No.: US 11,711,611 B2
(45) Date of Patent: Jul. 25, 2023

(54) IMAGE CAPTURING APPARATUS, STORAGE MEDIUM, AND IMAGE CAPTURING METHOD

(71) Applicant: CANON KABUSHIKI KAISHA, Tokyo (JP)

(72) Inventor: Takeshi Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/683,810

(22) Filed: Mar. 1, 2022

(65) Prior Publication Data

US 2022/0286620 A1 Sep. 8, 2022

(30) Foreign Application Priority Data

Mar. 2, 2021 (JP) ................................. 2021-032978

(51) Int. Cl.
*H04N 23/67* (2023.01)
*H04N 23/80* (2023.01)

(52) U.S. Cl.
CPC ......... *H04N 23/675* (2023.01); *H04N 23/672* (2023.01); *H04N 23/80* (2023.01)

(58) Field of Classification Search
CPC ...... A61K 8/0212; A61K 8/042; A61K 8/731; A61K 8/733; A61K 8/8147; A61K 8/8176; A61K 8/8182; A61K 8/86; A61Q 19/00; A61Q 19/08
See application file for complete search history.

(56) References Cited

U.S. PATENT DOCUMENTS

| 4,737,813 | A  | * | 4/1988  | Ishida ...................... G02B 7/34 396/93 |
| 10,122,911 | B2 |   | 11/2018 | Takao |
| 10,326,926 | B2 | * | 6/2019  | Mizuno .................. H04N 23/10 |
| 11,099,459 | B2 |   | 8/2021  | Watanabe et al. |
| 2016/0127637 | A1 | * | 5/2016 | Takao .................... G03B 17/14 348/208.12 |

(Continued)

FOREIGN PATENT DOCUMENTS

| JP | 2015-222411 A | 12/2015 |
| JP | 2017-142333 A | 8/2017 |

*Primary Examiner* — Hung H Lam
(74) *Attorney, Agent, or Firm* — Cowan, Liebowitz & Latman, P.C.

(57) ABSTRACT

An image capturing apparatus capable of performing highly-accurate focus detection at a high frame rate with minimal time lag is provided with a focus position detection unit configured to calculate a focus position by using an image via an image capturing optical system, an aberration information acquisition unit configured to acquire aberration information of the image capturing optical system, a color information acquisition unit configured to acquire color information of a subject in a focus detection region, a first correction value calculation unit configured to calculate a first correction value for correcting the focus position based on the aberration information, a second correction value calculation unit configured to calculate a second correction value for correcting the focus position based on the first correction value and the color information, and a correction unit configured to correct the focus position by using the second correction value.

10 Claims, 14 Drawing Sheets

(56) References Cited

U.S. PATENT DOCUMENTS

| | | | |
|---|---|---|---|
| 2017/0230567 A1* | 8/2017 | Takao | H04N 23/672 |
| 2021/0289143 A1* | 9/2021 | Shiozaki | H04N 23/663 |
| 2022/0392096 A1* | 12/2022 | Komatsu | G06V 10/22 |

* cited by examiner

IMAGE CAPTURING APPARATUS, STORAGE MEDIUM, AND IMAGE CAPTURING METHOD

BACKGROUND OF THE INVENTION

Field of the Invention

The present invention relates to an image capturing apparatus and the like, and in particular relates to an image capturing apparatus and the like capable of detecting a focus position.

Description of the Related Art

In an image capturing apparatus, a contrast detection method and a phase detection method exist as methods for performing automatic focus detection by using an image obtained from an image sensor. In either of these methods, the output of the image sensor is filtered by a band-pass filter, and by using a frequency component having a predetermined narrow width that is lower than the Nyquist frequency, in addition to improving the signal-to-noise ratio, the memory and the amount of calculation and the like are reduced. In addition, at the time of focus detection, signals of pixels are added in the image sensor so as to reduce the sampling rate. As described above, the frequency band used at the time of focus detection with respect to the captured image is different from the frequency band of the image for display or for recording.

In addition, there is a phenomenon in which the position of a focus lens having the highest contrast for each spatial frequency is slightly deviated due to the influence of an aberration of the lens. Because the aberration of a lens depends on the optical design, in an interchangeable lens type imaging apparatus, aberration characteristics are changed by a lens to be mounted. In addition, even for the same interchangeable lens, specifications on the image capturing apparatus side are different depending on the product, and therefore, frequency characteristics for focus detection differ.

For example, Japanese Patent Laid-Open No. 2015-222411 discloses a method for calculating a correction value by storing the relationship between aberration and spatial frequency as a set of characteristic curves for each aperture and focus position on the lens or imaging device side, and selecting a curve in accordance with conditions.

In this way, even if a large number of combinations of an interchangeable lens and an image capturing apparatus exists, correction can be performed.

In addition, Japanese Patent aid-Open No. 2017-142333 discloses a method for detecting and correcting information obtained from a captured image with respect to a focus position shift occurring in accordance with a color, a frequency, a direction of an edge, or the like of a subject. Thus, even in a subject that is, for example, extremely red or blue, correcting the deviation of the focus position caused thereby is possible.

However, in the prior art disclosed in Japanese Patent Laid-Open No. 2017-142333 described above, there is a need to solve a long polynomial equation using floating point, and there is a problem that a time lag until a lens is driven to reflect the focus detection result increases because of an increased amount of calculation. Therefore, there is a problem that a release time lag between the time of a user pressing a release button and the start of image capture becomes longer, increasing the possibility of missing a shutter opportunity.

Therefore, one of purposes of the present invention is to provide an image capturing apparatus capable of performing highly-accurate focus detection at a high frame rate with minimal time lag.

SUMMARY OF THE INVENTION

In order to achieve the above object, an image capturing apparatus according to one aspect of the present invention comprises:
at least one processor or circuit configured to function as:
a focus position detection unit configured to calculate a focus position by using an image via an image capturing optical system,
an aberration information acquisition unit configured to acquire aberration information of the image capturing optical system,
a color information acquisition unit configured to acquire color information of a subject in a focus detection region,
a first correction value calculation unit configured to calculate a first correction value for correcting the focus position based on the aberration information,
a second correction value calculation unit configured to calculate a second correction value for correcting the focus position based on the first correction value and the color information, and
a correction unit configured to correct the focus position by using the second correction value.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

In the embodiments, an example applied to a digital still camera serving as an image pickup apparatus will be described. However, the image pickup apparatus includes electronic apparatuses and the like having an image capturing function such as a digital movie camera, a smartphone with a camera, a tablet computer a camera, a network camera, and a camera which is mounted on a moving body.

Embodiment 1

Figure 1:
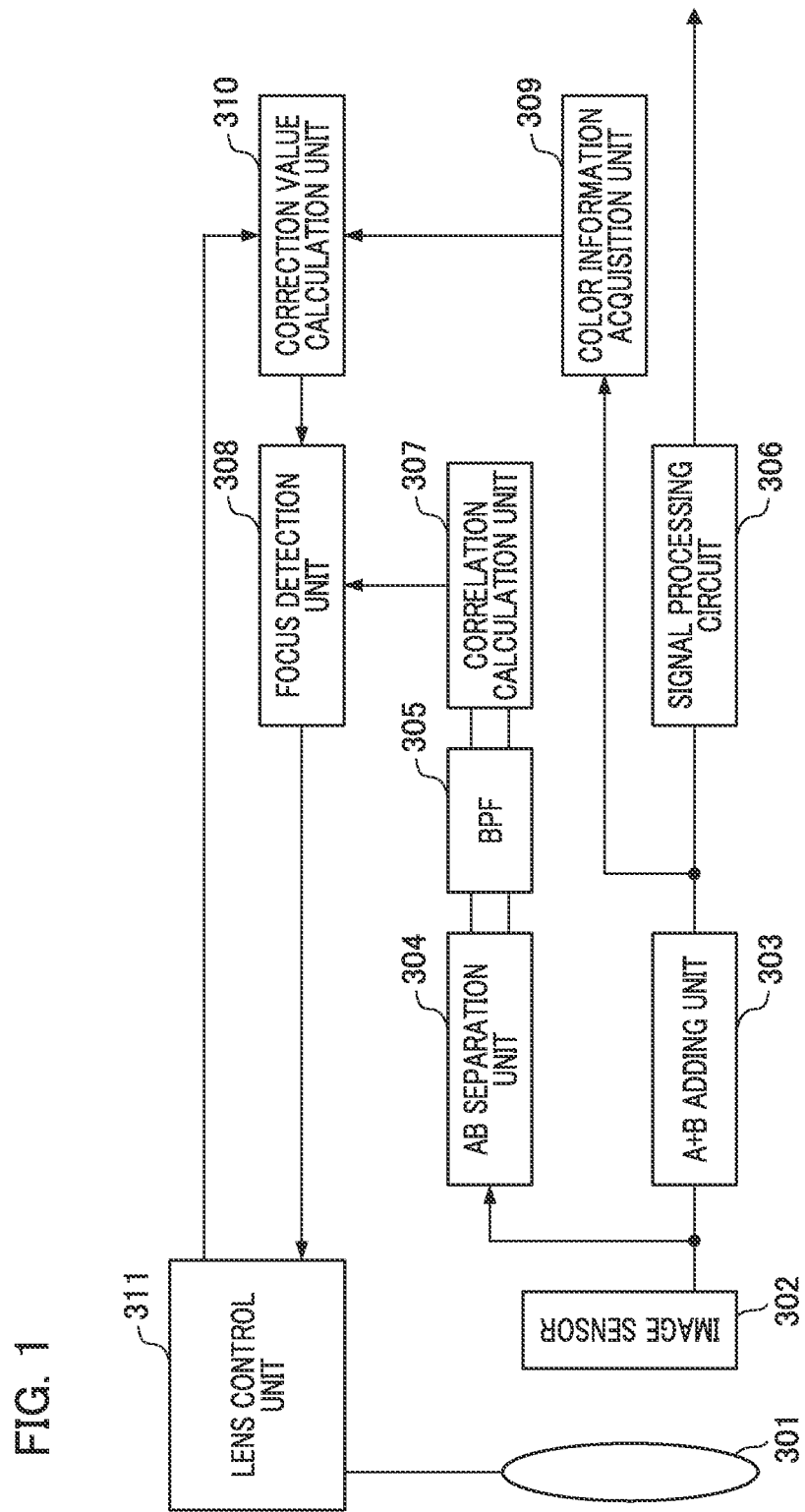
FIG. 1 is a block diagram of an image pickup apparatus according to Embodiment 1.
Figure 2:
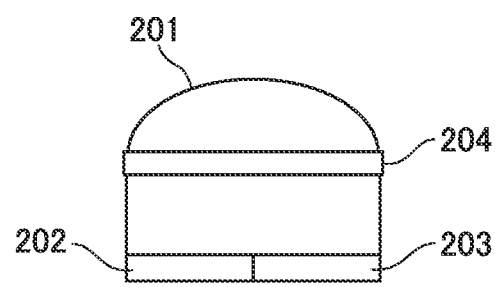
FIG. 2 is a sectional view illustrating pixels of an image sensor according to Embodiment 1.

FIG. 1 is a block diagram of an image pickup apparatus according to Embodiment 1. FIG. 2 is a sectional view illustrating pixels of an image sensor according to Embodiment 1.

Note that the operation of the entire image capturing apparatus is controlled by executing a computer program stored in a memory (not shown) by a microcomputer (not shown).

A lens 301 is, for example, a lens disposed in an interchangeable lens barrel attachable to and detachable from the image capturing apparatus. An image formed on the image capturing surface of an image sensor 302 is read out as an electric signal from the image sensor 302 by the lens 301. Each pixel of the image sensor 302 has a configuration as shown in FIG. 2.

FIG. 2 is a sectional view illustrating pixels of an image sensor according to Embodiment 1. In FIG. 2, 201 is a micro lens disposed on a pixel, 204 is a color filter, and 202 and 203 are each a photoelectric conversion unit. The light condensed by the micro lens 201 is made incident on the photoelectric conversion units 202 and 203 through one color filter 204 in a color filter such as R (red), G (green), and B (blue) and is converted into respective electrical signals. Note that color filters such as R, G, or B are disposed in an array such as a Bayer array corresponding to the plurality of pixels of the image sensor 302.

Photoelectric conversion units 202 and 203 forms two signals having parallax by receiving light passing through different pupil positions of the lens 301. Here, an A signal is obtained as a photoelectric conversion signal from the photoelectric conversion portion 202, and a B signal is obtained as a photoelectric conversion signal from the photoelectric conversion portion 203. A set of A signals of a plurality of pixels forms an A image signal, and a set of B signals of a plurality of pixels forms a B image signal. The A image signal and the B image signal are two image signals having parallax, and by calculating the correlated phase difference between both image signals, the distance to the subject and the defocus amount can be obtained.

A method for detecting a focus by applying such a principle is known as an imaging plane phase-difference type method. In contrast, the A+B signal obtained by adding the A signal and the B signal of each pixel can be treated as a normal image signal, and a set of A+B signals from a plurality of pixels can be displayed on a display or recorded as a normal image signal.

In other words, the A signal and the B signal of each pixel that is output from the image sensor 302 in FIG. 1 are added by an A+B adding unit 303 to form a normal pixel signal, which is then converted into a color image signal by a signal processing circuit 306 and transferred to a subsequent stage.

Blocks after the signal processing circuit 306 are omitted. However, they are treated as a normal image signal (video signal) in an image capturing apparatus by being supplied to a recording circuit, a display circuit, and the like.

Note that a color information acquisition unit 309 acquires statistical information of the color of a subject in the image signal based on the output of the A+B adding unit 303.

An A signal and a B signal of each pixel output from the image sensor 302 are also input to an AB separation unit 304, and the A image signal consisting of the A signal of a plurality of pixels and the B image signal consisting of the B signal of a plurality of pixels are respectively input to a BPF (band pass filter) 305. Next, each of the signals are processed into a signal having only a specific frequency band that is lower than the Nyquist frequency. The output from the BPF 305 is input to a correlation calculation unit 307, and the amount and direction of the correlation phase difference between the A image signal and the B image signal are calculated.

A focus detection unit 308 calculates a defocus amount by using the output of the correlation calculation unit 307 and the correction value calculated by a correction value calculation unit 310, sends a control signal to a lens control unit 311, and drives the lens 301. Next, for example, the focal position of the lens is adjusted for exposure (image capture) of a next frame. That is, the focus detection unit 308 calculates a focus position by using an image via an image capturing optical system.

The correction value calculation unit 310 calculates a correction value by using the aberration information of the lens acquired from the lens control unit 311 and color information acquired from the color information acquisition unit 309. Here, the correction value calculation unit 310 functions as an aberration information acquisition unit configured to acquire aberration information of the image capturing optical system, and the color information acquisition unit acquires the color information of a subject in the focus detection region.

Note that, in Embodiment 1, a calculation process in the correction value calculation unit 310 and the like is characterized.

In Embodiment 1, as described above, an interchangeable lens barrel is used, and the lens 301 and the lens control unit 311 are disposed in the interchangeable lens barrel. Accordingly, when the lens barrel is exchanged, optical characteristics such as aberration of the lens change.

In Embodiment 1, the lens control unit 311 is provided with an internal lens memory (not shown) that stores optical characteristic information such as an aberration of the lens. Next, by performing communication between the body of the image capturing unit and the lens control unit 311 via a communication path (not shown), the correction value calculation unit 310 and the focus detection unit 308 can acquire optical characteristic information, such as aberration information of the lens, from an internal lens memory.

FIG. 3 is a diagram showing the relationship between contrast and a focus position of an image.

Figure 3A:
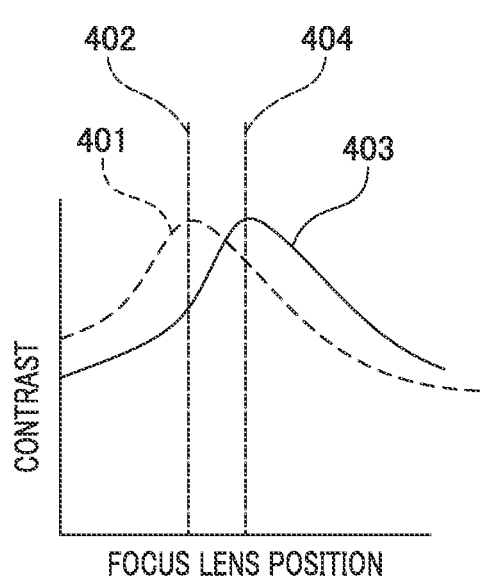
FIG. 3A is a diagram showing the relationship between the contrast of an image obtained through a predetermined lens A and the position of a focus lens.

FIG. 3A is a diagram showing the relationship between the contrast of an image obtained through a predetermined lens A and the position of a focus lens, and the vertical axis indicates the contrast, and the horizontal axis indicates the focus lens position.

401 indicates a contrast curve of a first frequency band with a predetermined bandwidth that is lower than the Nyquist frequency band limited by the BPF 305, and the position of 402 has the highest contrast.

Therefore, when the focus lens is at the position of 402, a focused image should be obtained.

Conversely, 403 is the contrast curve of a second frequency band extending to the vicinity of the Nyquist frequency of a video signal of the signal processing circuit 306. That is, the second frequency band for the video signal is wider than that of the first frequency band.

The output of the signal processing circuit 306 is a wider bandwidth than the BPF 305 and is included from a low frequency to a high frequency, and a state in which the contrast in the vicinity of the Nyquist frequency is high is a state in which the image is visually in focus. Therefore, if there is a focus lens position at a position of 404, which is the peak of the curve, it is visually perceived that there is focus.

That is, when the focus lens is controlled to the position 402, which is the focus position calculated based on the correlation phase difference obtained from the correlation calculation unit 307, an image in which the focus is slightly blurred is obtained in an image obtained from the signal processing circuit 306. In the present embodiment, the correction value calculation unit 310 is used to calculate the correction value for correcting the difference between 402 and 404 and moving the lens to the position of 404.

Figure 3B:
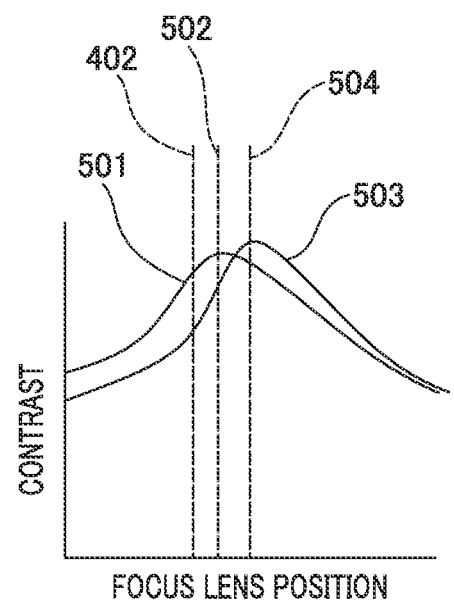
FIG. 3B is a diagram showing the relationship between the contrast and the focus lens position in a lens B that is different from the lens A.

FIG. 3B is a diagram showing the relationship between the contrast and the focus lens position in a lens B that is different from the lens A. 501 is the contrast curve of the output of the BPF 305, and 503 is the contrast curve of the output of the signal processing circuit 306. 502 and 504 indicate the peaks of the contrast curves 501 and 503, respectively.

As shown in FIG. 3B, the peak position 502 of the contrast curve 501 of the BPF 305 output of lens B is different from the peak position 402 of the contrast curve of the BPF 305 output of lens A. That is, because the lens B and the lens A have different optical characteristics, if the correction is not calculated in accordance with the respective characteristics, it is not possible to obtain a correctly focus detected image.

Figure 4A:
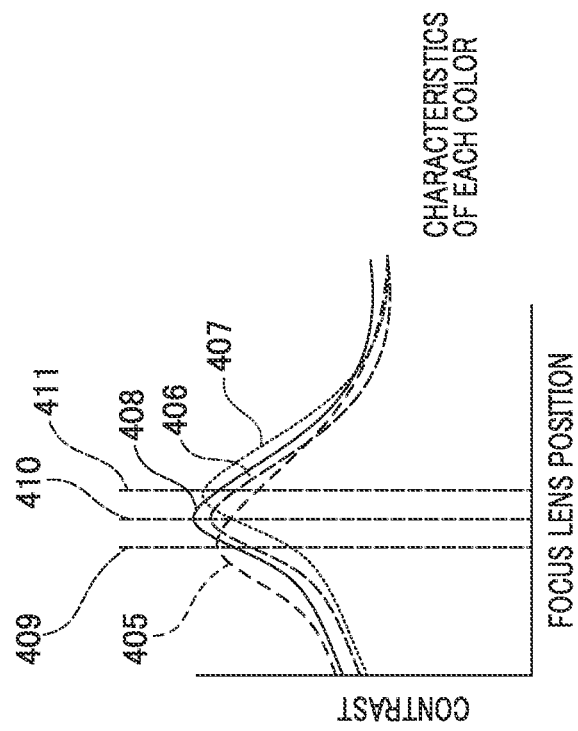
FIG. 4A s a diagram showing the relationship between the contrast and the focus lens position of the same lens A as that of FIG. 3A.
Figure 4B:
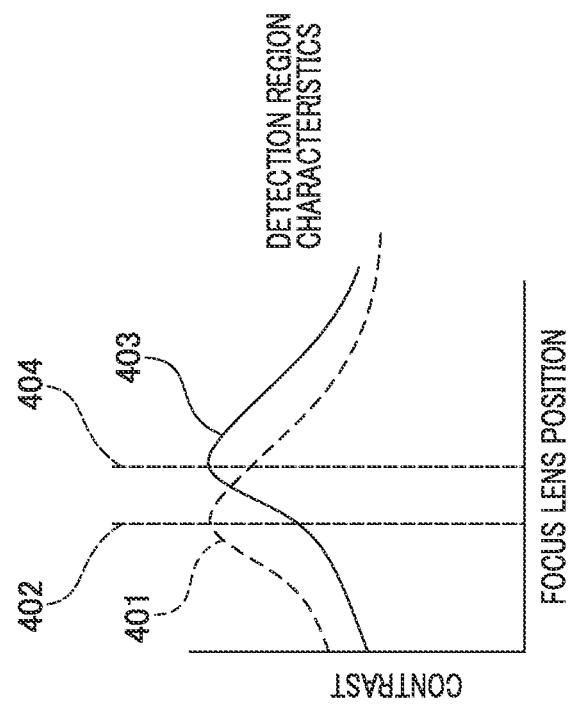
FIG. 4B is a diagram showing the characteristics of a curve 403 of FIG. 4A, further divided into finer details for each color.

FIG. 4 is a diagram for explaining aberrations for each color. FIG. 4A is a diagram showing the relationship between the contrast and the focus lens position of the same lens A as that of FIG. 3A. FIG. 4B is a diagram showing the characteristics of a curve 403 of FIG. 4A, further divided into finer details for each color. 405, 406, and 407 show the relationship between the contrast and the focus position in the wavelengths of R, G, and B, respectively. The peak positions of the contrast curves 405 to 407 for R, G. and B are 409 to 411, respectively, and the contrast curve obtained by synthesizing the contrast curves 405 to 407 for R, G, and B is the curve 408.

Due to the influence of aberration, the peak position (focus position) of a contrast curve slightly deviates for each color. However, because various color components are included in an image, the peak position 410 of the contrast curve 408 is generally preferably used.

However, in a case where the color of a subject is extremely deviated to red or blue, for example when a red flower and the like is photographed, the position must be 409 instead of 410, or the focus will become blurred.

In the present embodiment, satisfactory correction values can be obtained even in such a case.

Figure 5A:
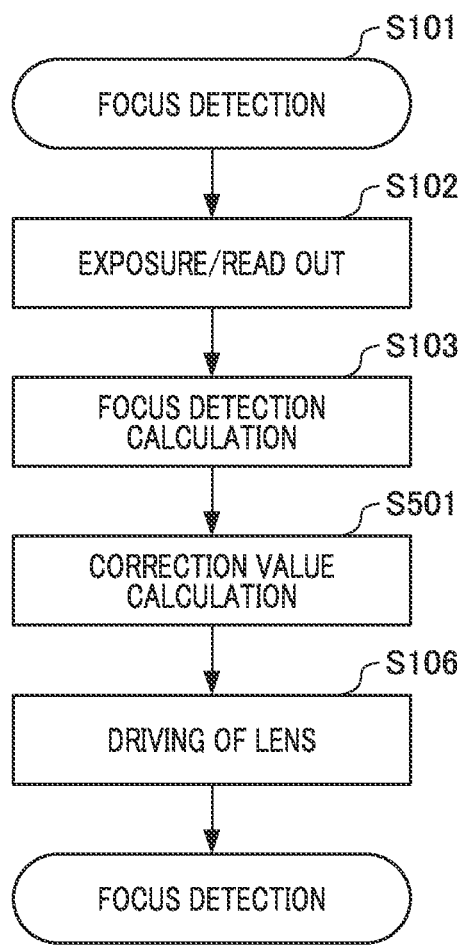
FIG. 5A is a flowchart of an entire focus detection operation.

FIG. 5 is a flowchart of a correction value calculation process according to the conventional technology, and FIG. 5A is a flowchart of the entire focus detection operation.

When focus detection is started in step S101, in step S102, for example, an exposure (image capture) operation for one frame is performed in the image sensor and thereafter, the image is read out.

In step S103, the focus detection unit 308 calculates a defocus amount by using the result of the correlation calculation unit 307. In step S501, a correction value configured to correct a focus position according to the subject color is calculated, and in step S106, based on the correction value, the lens is driven with respect to the corrected focusing position. Thereafter, the processing returns to step S101 and the focus detection operation is repeated.

Figure 5B:
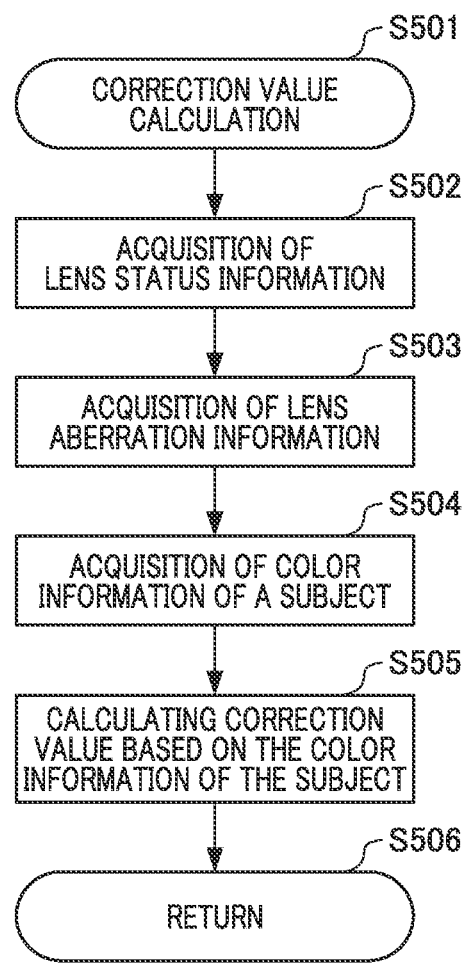
FIG. 5B is a flowchart showing the correction value calculation flow of step S501 in FIG. 5A in detail.

FIG. 5B is a flowchart showing the correction value calculation flow of step S501 in FIG. 5A in detail. In step S502, lens status information is acquired. The lens status information includes a current focus lens position and an aperture value and the like. Next, in step S503, aberration information of the lens is acquired from the memory in the lens barrel.

Next, in step S504, the color information of a subject is acquired from the color information acquisition unit 309. In step S505, a predetermined calculation is performed based on the information obtained in steps S502 to S504, and a correction value is obtained. The processing performed in step S505 will be described in detail below.

Whereas an aberration shows different characteristics in a concentric direction and in a radial direction, a pixel is a rectangle consisting of several pixels arranged in the lateral and vertical directions.

In addition, optical material such as lenses having a plurality of different sizes is supported by a frame and the like in the lens barrel and arranged aligned in the optical axis direction, and the paths of light that reach each coordinate of the image capturing surface of the image sensor differ. In addition, the shape of the optical vignette, which is the shape of the light limited by the frame or the like in the lens barrel, also differs greatly depending on the location. Therefore, the aberration information has a complex shape rendered based on these optical calculations, and in order to store the shape in a small memory, the shape is stored as a calculation expression of a curve-fitted polynomial.

For example, the information MTF_P_RH of the position of the focus lens indicating the maximum value of the defocus MTF is shown by Equation (1) below. That is, for example, each of six combinations of colors and vertical and horizontal directions is expressed in the following Equation (1), wherein the spatial frequency f and the position coordinates (x, y) of the focus detection region on the image sensor are the variables.

$$MTF\_P\_RH(f,x,y)=(rh(0){\times}x+rh(1){\times}y+rh(2)){\times}f2+(rh(3){\times}x+rh(4){\times}y+rh(5)){\times}f+(rh(6){\times}x+rh(7){\times}y+rh(8)) \quad (1)$$

Note that Equation (1) represents the equation of the information MTF_P_RH of the focus lens position indicating the maximum value of the defocus MTF for each spatial frequency corresponding to the horizontal (H) direction with respect to the red (R) color signal, and the other combinations are represented by similar equations. That is, in addition, in the present embodiment, it is assumed that rh(n)

($0 \leq n \leq 8$) is stored in advance in the memory in the lens barrel, and the image capturing apparatus acquires rh(n) ($0 \leq n \leq 8$) by requesting the CPU in the lens barrel. However, rh(n) ($0 \leq n \leq 8$) may be stored in the memory of the image capturing apparatus.

The coefficients (rv, gh, gv, bh, bv) for each combination of red and vertical (MTF_P_RV), green and horizontal (MTF_P_GH), green and vertical (MTF_P_GV), blue and horizontal (MTF_P_BH), and blue and vertical (MTF_P_BV) can be similarly stored and acquired.

When the spatial frequency f and the position coordinates (x, y) of the focus detection region are input as variables, the frequency characteristics of a position can be obtained. The correction values described above can be obtained by acquiring such curves for each color (R, G, B), vertical and horizontal direction, and for each frequency, and then synthesizing them.

When the spatial frequency is set discretely by only 10, the curve of the total of 60 surfaces of vertical and horizontal (2)×RGB (3)× spatial frequency (10) is calculated based on the curve. Further, because it becomes a very long polynomial, the curve is calculated in floating point arithmetic.

Because these curves change when the lens aperture is changed, the zoom position is changed, or the focus position is changed (distance to the pupil is changed), the calculation must be performed in real time.

When the position coordinates (x, y) of the focus detection region for calculating the correction value are determined, the characteristics for each spatial frequency are represented by the following Equation (2):

$$MTF\_P\_RH(f)=Arh \times f2+Brh \times f+Crh \quad (2)$$

MTF_P_RV(f), MTF_P_GH(f), MTF_P_GV(f), MTF_P_BH(f), and MTF_P_BV(f) are calculated in a similar manner.

Next, in accordance with the characteristics of a signal used for AF which is pupil separated, the following calculations are performed for each spatial frequency based on Equation (3) below. That is, the spatial frequency characteristic MTF_P_AF (f) for focus detection is obtained by using Equation (3).

$$MTF\_P\_AF(f)=K\_AF\_R \times K\_AF\_H \times MTF\_P\_RH(f)+ \\ K\_AF\_R \times K\_AF\_V \times MTF\_P\_RV(f)+K\_AF\_G \times \\ K\_AF\_H \times MTF\_P\_GH(f)+K\_AF\_G \times K\_AF\_V \times \\ MTF\_P\_GV(f)+K\_AF\_B \times K\_AF\_H \times MTF\_P\_BH \\ (f)+K\_AF\_B \times K\_AF\_V \times MTF\_P\_BV(f) \quad (3)$$

Here, K_AF_R, K_AF_G, and K_AF_B are information indicating the magnitude of weighting for focus detection with respect to R, G, and B. In addition, K_AF_H and K_AF_V are information indicating the magnitude of the weighting for focus detection with respect to the direction (horizontal, vertical) of contrast, and these pieces of information are stored in advance in a memory in a lens barrel or in an image capturing apparatus.

Similarly, a spatial frequency characteristic MTF_P_IMG (f) for a captured image is calculated by the following Equation (4):

$$MTF\_P\_IMG(f)=K\_IMG\_R \times K\_IMG\_H \times MTF\_P\_RH \\ (f)+K\_IMG\_R \times K\_IMG\_V \times MTF\_P\_RV(f)+ \\ K\_IMG\_G \times K\_IMG\_H \times MTF\_P\_GH(f)+ \\ K\_IMG\_G \times K\_IMG\_V \times MTF\_P\_GV(f)+ \\ K\_IMG\_B \times K\_IMG\_H \times MTF\_P\_BH(f)+ \\ K\_IMG\_B \times K\_IMG\_V \times MTF\_P\_BV(f) \quad (4)$$

K_IMG_R, K_IMG_G and K_IMG_B are information indicating the magnitude of weighting of the captured image with respect to R, G. and B. In addition, K_IMG_H and K_IMG_V are information indicating the magnitude of weighting of the captured image in the direction (horizontal and vertical) of contrast, and these pieces of information are stored in advance in a memory in a lens barrel or in an image capturing apparatus.

In addition, based on characteristics calculated for each frequency, a representative value (in-focus position detected by AF (P_AF)) in accordance with the characteristics of the BPF 305 is calculated by the following Equation (5).

$$P\_AF=MTF\_P\_AF(1) \times K\_AF\_FQ(1)+MTF\_P\_AF \\ (2) \times K\_AF\_FQ(2)+MTF\_P\_AF(3) \times K\_AF\_FQ \\ (3)+MTF\_P\_AF(4) \times K\_AF\_FQ(4)+MTF\_P\_AF \\ (5) \times K\_AF\_FQ(5)+MTF\_P\_AF(6) \times K\_AF\_FQ \\ (6)+MTF\_P\_AF(7) \times K\_AF\_FQ(7)+MTF\_P\_AF \\ (8) \times K\_AF\_FQ(8)+MTF\_P\_AF(9) \times K\_AF\_FQ \\ (9)+MTF\_P\_AF(10) \times K\_AF\_FQ(10) \quad (5)$$

Here. MTF_P_AF (1) to MTF_P_AF(10) are the MTF_P_AF(f) calculated in Equation (3) for each spatial frequency. In addition, K_AF_FQ (1) to K_AF_FQ (10) are information indicating the magnitude of weighting for focus detection for each spatial frequency, and are stored in advance in a memory in a lens barrel or in an image capturing apparatus.

In addition, similarly, the representative value of the in-focus position (P_img) of the captured image in accordance with the characteristics of the signal processing circuit 306 is calculated by using Equation (6).

$$P\_img=MTF\_P\_IMG(1) \times K\_IMG\_FQ(1)+ \\ MTF\_P\_IMG(2) \times K\_IMG\_FQ(2)+MTF\_P\_IMG \\ (3) \times K\_IMG\_FQ(3)+MTF\_P\_IMG(4) \times \\ K\_IMG\_FQ(4)+MTF\_P\_IMG(5) \times K\_IMG\_FQ \\ (5)+MTF\_P\_IMG(6) \times K\_IMG\_FQ(6)+ \\ MTF\_P\_IMG(7) \times K\_IMG\_FQ(7)+MTF\_P\_IMG \\ (8) \times K\_IMG\_FQ(8)+MTF\_P\_IMG(9) \times \\ K\_IMG\_FQ(9)+MTF\_P\_IMG(10) \times K\_IMG\_FQ \\ (10) \quad (6)$$

Here, MTF_P_IMG (1) to MTF_P_IMG(10) are the MTF_P_IMG(f) calculated in Equation (4) with respect to each spatial frequency. In addition, K_IMG_FQ (1) to K_IMG_FQ (10) are the information indicating the magnitude of weighting for a captured image for each spatial frequency, and are stored in advance in a memory in a lens barrel or in an image capturing apparatus.

The BP correction value is obtained by calculating the difference between each representative value by the following Equation (7):

$$BP=P\_AF-P\_img \quad (7)$$

However, in the conventional technology, the above calculation cannot be performed until the output of the color information acquisition unit 309 is obtained in step S504. In contrast, it is increasingly necessary to calculate AF information at a plurality of positions of an image at high speed, and because the plurality of the positions also reaches several hundred points, the time lag due to the correction value calculation time becomes a serious problem.

Figure 6:
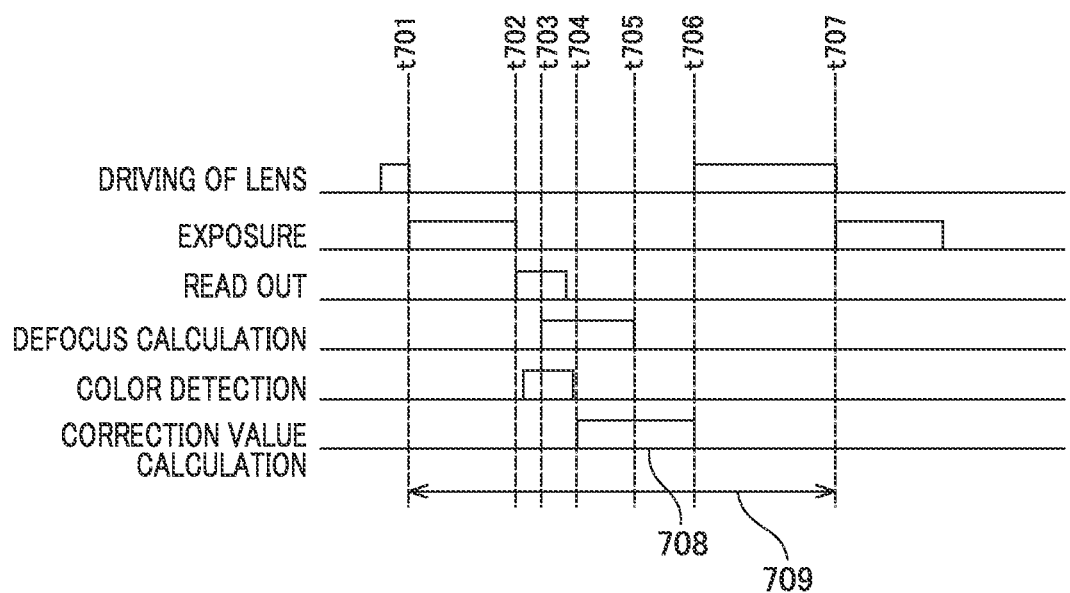
FIG. 6 is a timing chart of an image capturing apparatus of the conventional technology.

FIG. 6 is an operation timing chart of an image capturing apparatus of the conventional technology.

At t701, for example, exposure is started by shutter opening and the like, and at t702, a result captured by the exposure starts to be read out from the image sensor 302.

In addition, the color information acquisition unit 309 obtains color information in synchronization with the read-out. However, the completion of the color information is applied until, for example, the vicinity of t704 after completion of the read out from the image sensor 302. Even if the calculation of defocus is also started during the read out, time is required for the correlation calculation, and takes up to t705.

Because the correction value calculation in the correction value calculation unit 310 uses the output of the color information acquisition unit 309, operation cannot be started until t704.

After the timing t706, at which both defocus calculation and correction value calculation are completed, the driving of the lens can be finally started, and because the driving of the lens is completed and the focusing matches t707, the release time lag is a period of 709.

In the present embodiment, it is possible to shorten the time 708 among these correction operations.

Figure 7:
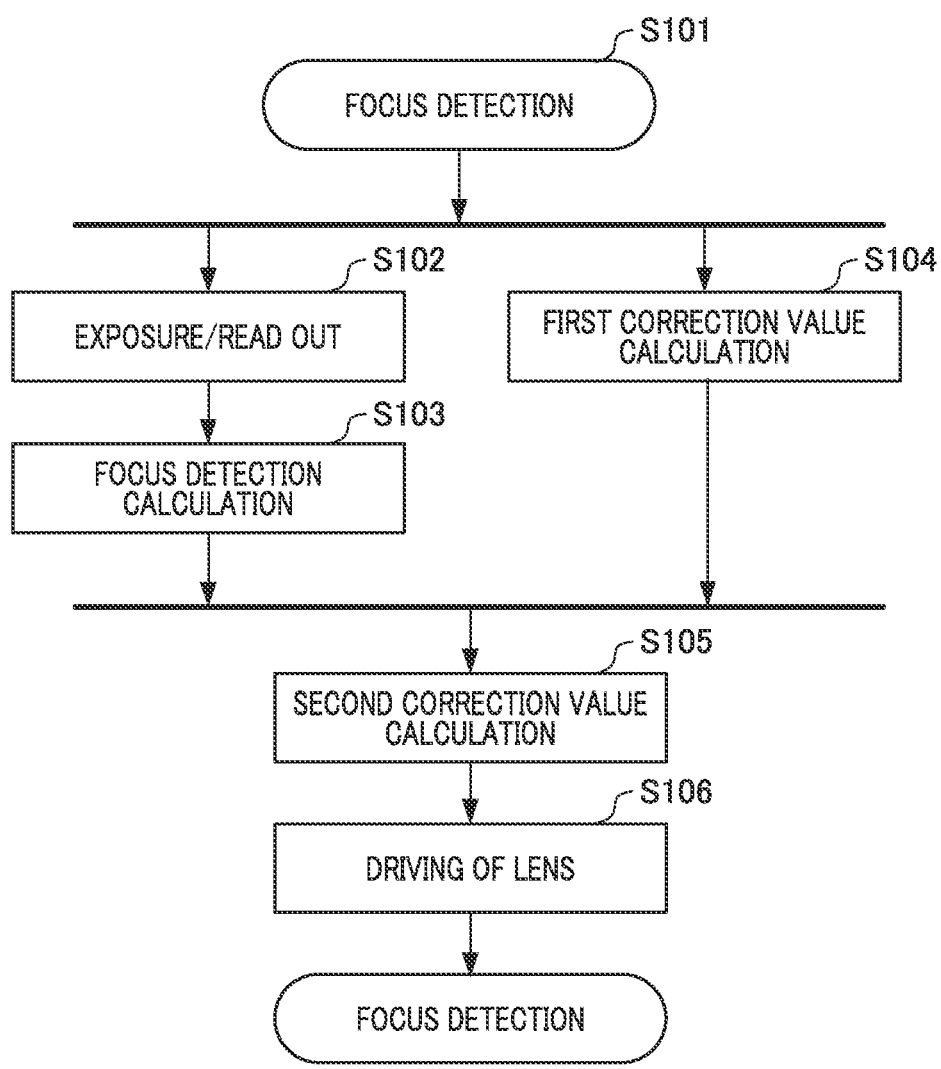
FIG. 7 is a flowchart of focus detection according to Embodiment 1.

FIG. 7 is a flowchart of focus detection according to Embodiment 1. Note that, in the flowcharts of FIGS. 7 to 9, and FIGS. 13A and 13B, each step of each drawing is executed by executing a computer program stored in a memory (not shown) by a computer (not shown) in an image capturing apparatus Focus detection is started in step S101, exposure (image capture) and read out processing are performed in step S102, and focus detection calculation is performed in step S103. In contrast, in parallel with step S102 and step S103, the first correction value calculation is performed in step S104. Here, step S104 functions as a first correction value calculation unit (first correction value calculation step) for calculating a first correction value for correcting the focus position based on the aberration information. Note that the first correction value calculation in step S104 will be described below with reference to the flowchart of FIG. 8.

In step S105, a second correction value calculation is performed, and in step S106, the lens is driven. Here, step S105 functions as a second correction value calculation unit (second correction value calculation step) that calculates a second correction value for correcting the focus position based on the first correction value and the color information. In addition, step S106 functions as a correction unit (correction step) that corrects the focus position by using the second correction value. The second correction value calculation in step S105 will be described later by using the flowchart of FIG. 9.

Thereafter, steps S101 to S106 are repeated.

Figure 8:
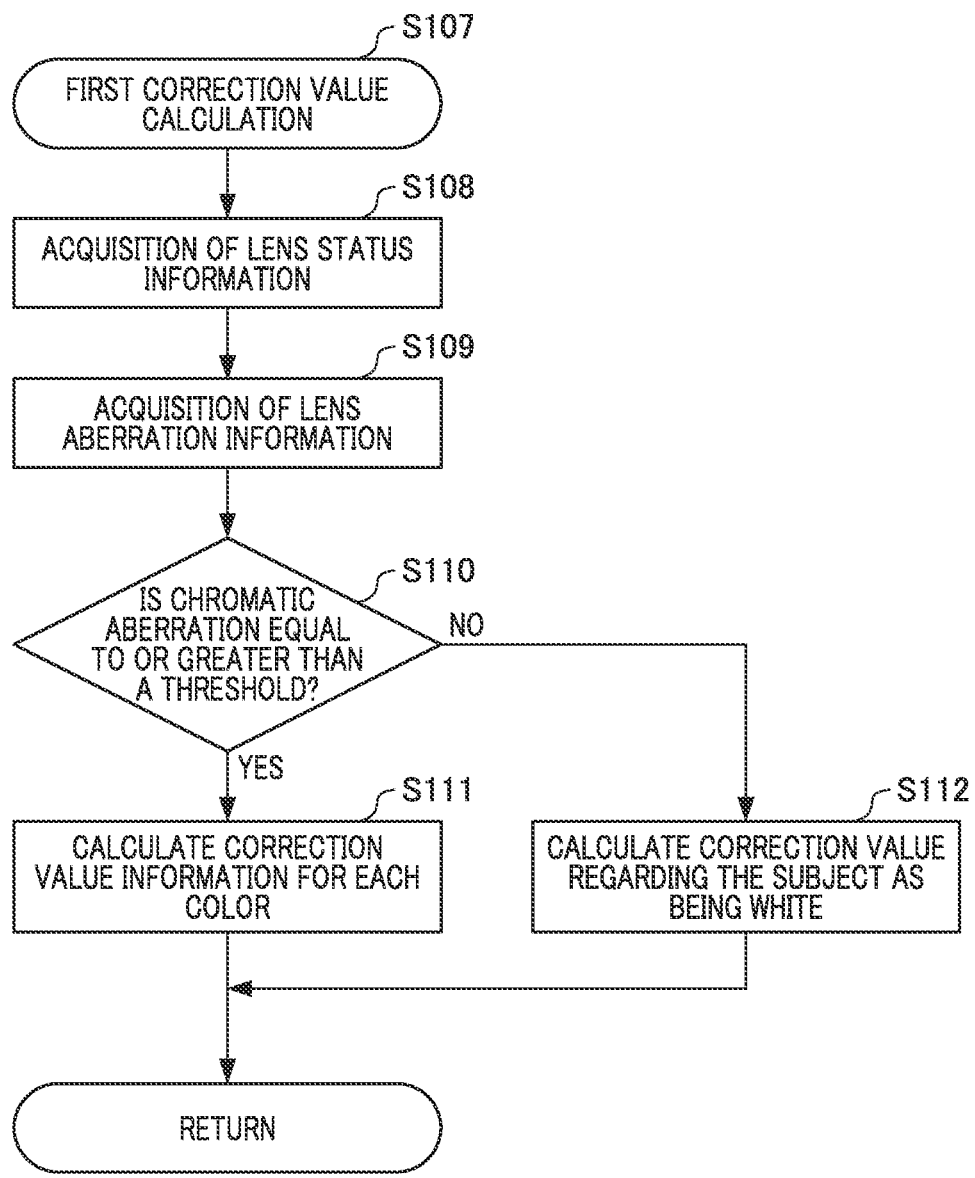
FIG. 8 is a flowchart showing step S104 in FIG. 7 in detail.

FIG. 8 is a flowchart showing step S104 in FIG. 7 in detail.

In step S107, the processing of the first correction value calculation is started, and in step S108, aberration information of the lens is acquired from a memory in the lens barrel (aberration information acquisition step). Note that the memory in the lens barrel stores the peak position 410 and the like of the contrast curve 408 in FIG. 4.

In addition, information relating to a difference between a peak position 409 of a contrast curve 405 of R, a peak position 411 of a contrast curve 407 of B, and a peak position 410 of a contrast curve 408, and weighting data of the above-described equations 1 to 6 are stored in advance, and these values are also acquired. In step S109, the color information of a subject is acquired from the color information acquisition unit 309.

In step S110, it is confirmed whether or not the chromatic aberration of the lens is equal to or greater than a threshold.

That is, in a case where the chromatic aberration of the lens is lower than a predetermined threshold ("No" in step S110) by referring to the information of the peak position of each color acquired in step S108, the processing proceeds to step S112. In this case, the deviation of the focus position due to the color is small, and even if the saturation of the subject is high, the focus position is not deviated, and therefore, in step S112, a correction value is calculated by regarding the subject as being white without considering color information.

Referring to the information of the peak position for each color obtained in step S108, in a case where the chromatic aberration of the lens is equal to or greater than a predetermined threshold ("Yes" in step S110), because the deviation of the focus position by the color is large, the processing proceeds to step S111. In step S111, the correction value information for each color is calculated. In this way, in step S110, whether or not to calculate a first correction value for each color switches in accordance with the aberration information acquired by the aberration information acquisition unit.

The calculation at this time is different from the conventional Equation (3), and becomes a result for each color as shown in the following Equation (8):

$$MTF\_P\_AF\_R(f)=K\_AF\_H \times MTF\_P\_RH(f)+ K\_AF\_V \times MTF\_P\_RV(f) \quad (8)$$

In addition, similar to Equation (8), MTF_P_AF_G(f) and MTF_P_AF_B(f) are calculated for G and B, respectively. In addition, MTF_P_IMG_R(f), MTF_P_IMG_G(f), and MTF_P_IMG_B(f) are also calculated in the same manner.

Further, Equation (5) in the conventional example is represented by the following Equation (9).

$$P\_AF\_R = MTF\_P\_AF\_R(1) \times K\_AF\_FQ(1)+ \\ MTF\_P\_AF\_R(2) \times K\_AF\_FQ(2)+MTF\_P\_AF\_R \\ (3) \times K\_AF\_FQ(3)+MTF\_P\_AF\_R(4) \times K\_AF\_FQ \\ (4)+MTF\_P\_AF\_R(5) \times K\_AF\_FQ(5)+ \\ MTF\_P\_AF\_R(6) \times K\_AF\_FQ(6)+MTF\_P\_AF\_R \\ (7) \times K\_AF\_FQ(7)+MTF\_P\_AF\_R(8) \times K\_AF\_FQ \\ (8)+MTF\_P\_AF\_R(9)K\_AF\_FQ(9)+ \\ MTF\_P\_AF\_R(10) \times K\_AF\_FQ(10) \quad (9)$$

Here, MTF_P_AF_R(1) to MTF_P_AF_R(10) are MTF_P_AF_R (f) calculated by Equation (8) for each spatial frequency.

Similarly, with respect to P_AF_G, P_AF_RB, and P_img_R P_img_G, P_img_B, the result of the calculation becomes a first correction value.

Figure 9:
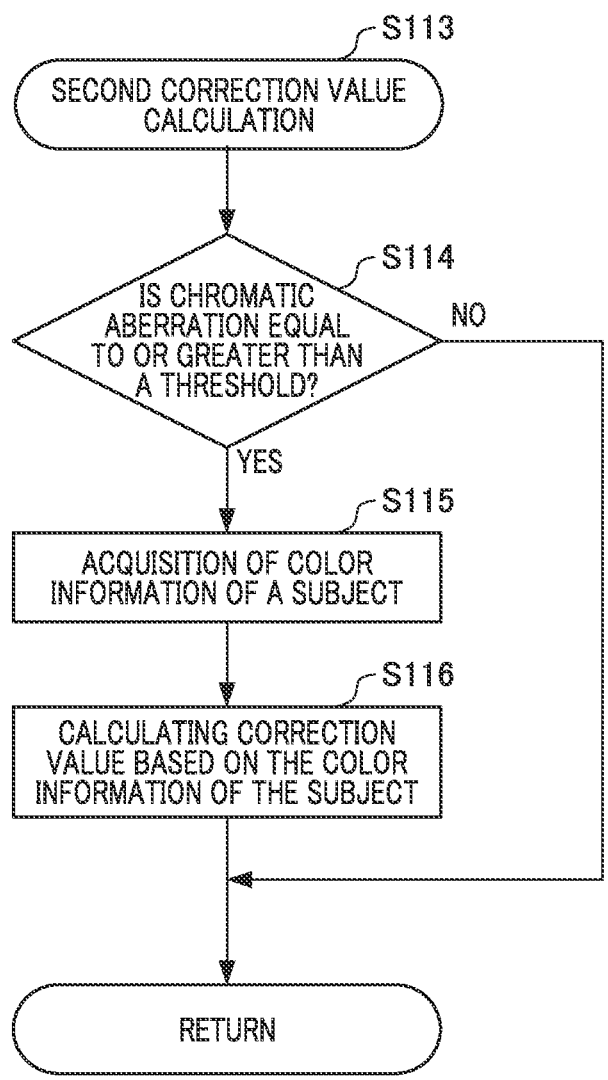
FIG. 9 is a flowchart showing step S105 in FIG. 7 in detail.

FIG. 9 is a flowchart showing step S105 in FIG. 7 in detail.

In step S113, the processing of the second correction value calculation is started, and in step S114, whether or not the chromatic aberration is equal to or greater than a threshold value is determined in the same manner as in step S10. That is, in the case of a lens in which the chromatic aberration is not large, "No" is obtained in step S114, and because the final correction value is already obtained, an additional correction value operation is not required.

In the case of "Yes" in step S114, the processing proceeds to step S115, and the color information of a subject (color information acquisition step) is acquired from the color information acquisition unit 309. In this way, in step S114, whether or not to perform the second correction value calculation switches according to the aberration information acquired by the aberration information acquisition unit. Based on the color information obtained here, K_AF_R, K_AF_G, and K_AF_B are determined.

That is, in step S116, for example, the final correction value is calculated, for example, by the following Equation (10) using the color information and the first correction value.

$$BP=(P\_AF\_R \times K\_AF\_R+P\_AF\_G \times K\_AF\_G+ \\ P\_AF\_B \times K\_AF\_B)-(P\_img\_R \times K\_AF\_R+ \\ P\_img\_G \times K\_AF\_G+P\_img\_G \times K\_AF\_G) \quad (10)$$

Figure 10:
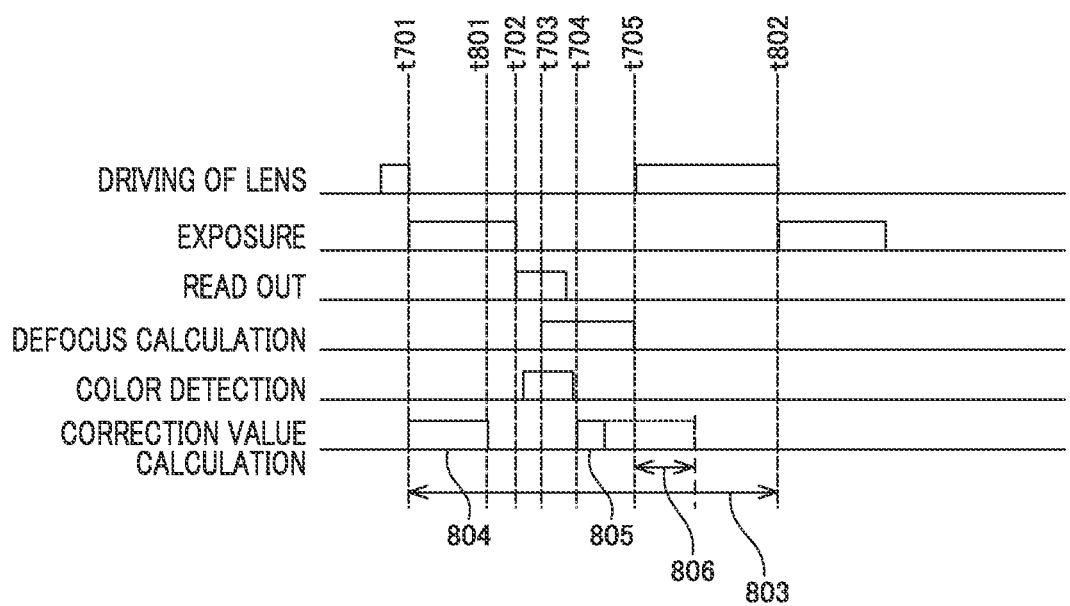
FIG. 10 is a timing chart of an image capturing apparatus according to Embodiment 1.

FIG. 10 is a timing chart of an image capturing apparatus according to Embodiment 1.

Explanations of the same parts as the timing chart of the conventional technology in FIG. 6 are omitted.

Reference numeral 804 in FIG. 10 denotes a first correction value calculation process in step S104 in FIG. 7, and reference numeral 805 denotes a second correction value calculation process in step S105 in FIG. 7. That is, the correction value calculation processing is divided into two, and the first correction value operation is performed during an exposure period.

That is, the focus position detection unit detects a focus position based on the image of the frame in t703 after the end of the exposure of the image of a predetermined frame captured in the period of t701 to t702 (focus position detection step). In contrast, the first correction value calculation unit calculates a first correction value in advance in periods t701 to t801 during the exposure of the image of the frame. In this way, because the time of the correction value calculation of the process 806 (the calculation of t705 to t706 in FIG. 6) is shifted to the timing of 804 and performed in parallel with the exposure operation, the release time lag 803 can be made shorter than the release time lag 709 of the conventional technology.

Embodiment 2

Figure 11:
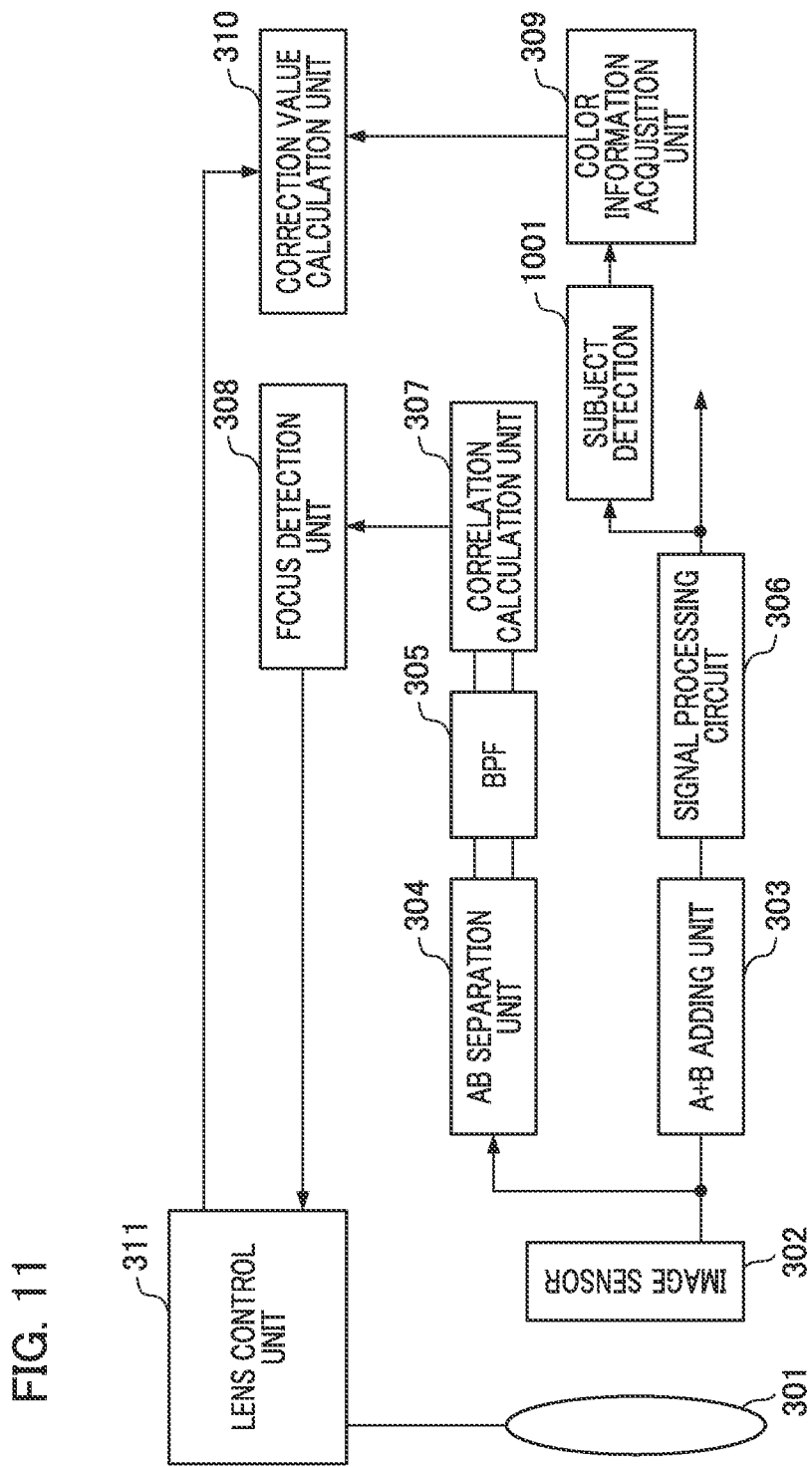
FIG. 11 is a block diagram of an image capturing apparatus according to Embodiment 2

FIG. 11 is a block diagram of an image capturing apparatus according to Embodiment 2. It differs from FIG. 1 on the point that that a subject detection unit 1001 is added.

The subject detection unit 1001 analyzes an output image of the signal processing circuit 306 to automatically set a focus detection region.

Note that a focus region setting unit may also manually set a focus detection region.

Figure 12:
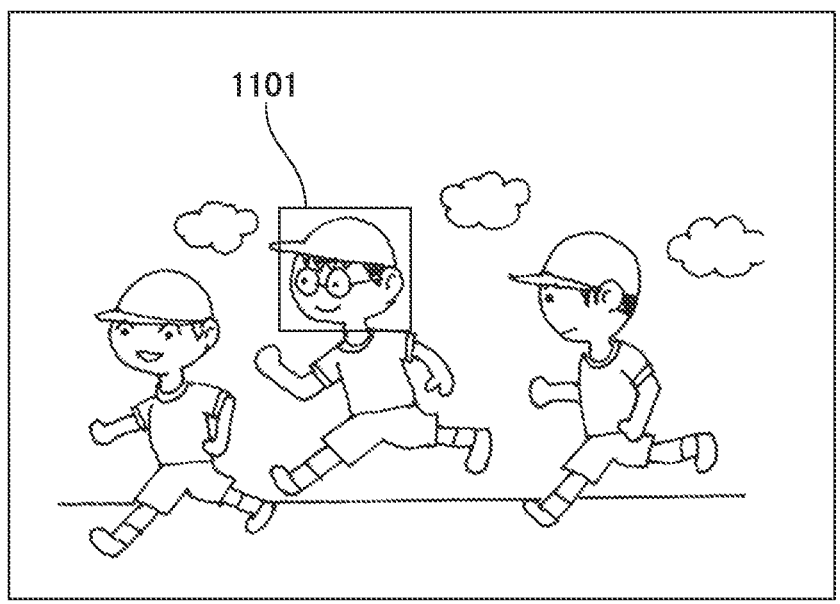
FIG. 12 is a diagram showing a detection frame detected by a subject detection unit 1001.

FIG. 12 is a diagram showing a detection frame 1101 detected by a subject detection unit 1001.

The detection of a subject may be performed by normal image recognition, or a deep learning technology may be used, and detailed description thereof is omitted.

Figure 13B:
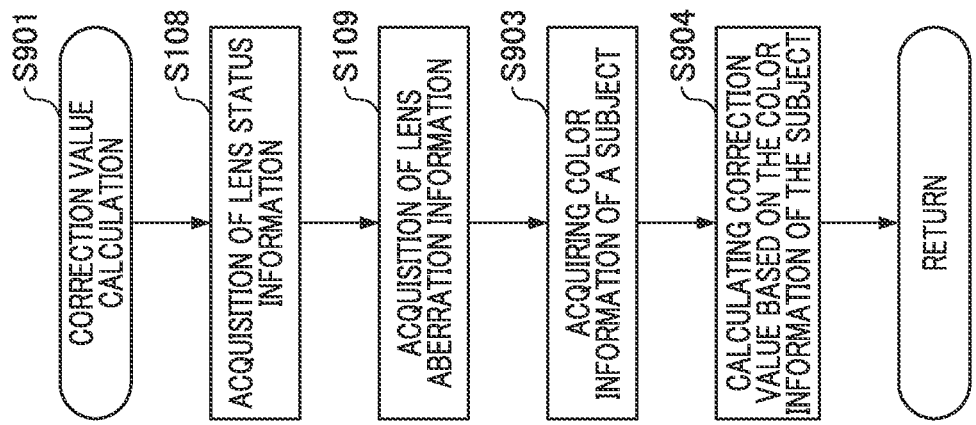
FIGS. 13A and 13B are flowcharts of focus detection according to Embodiment 2.
Figure 13A:
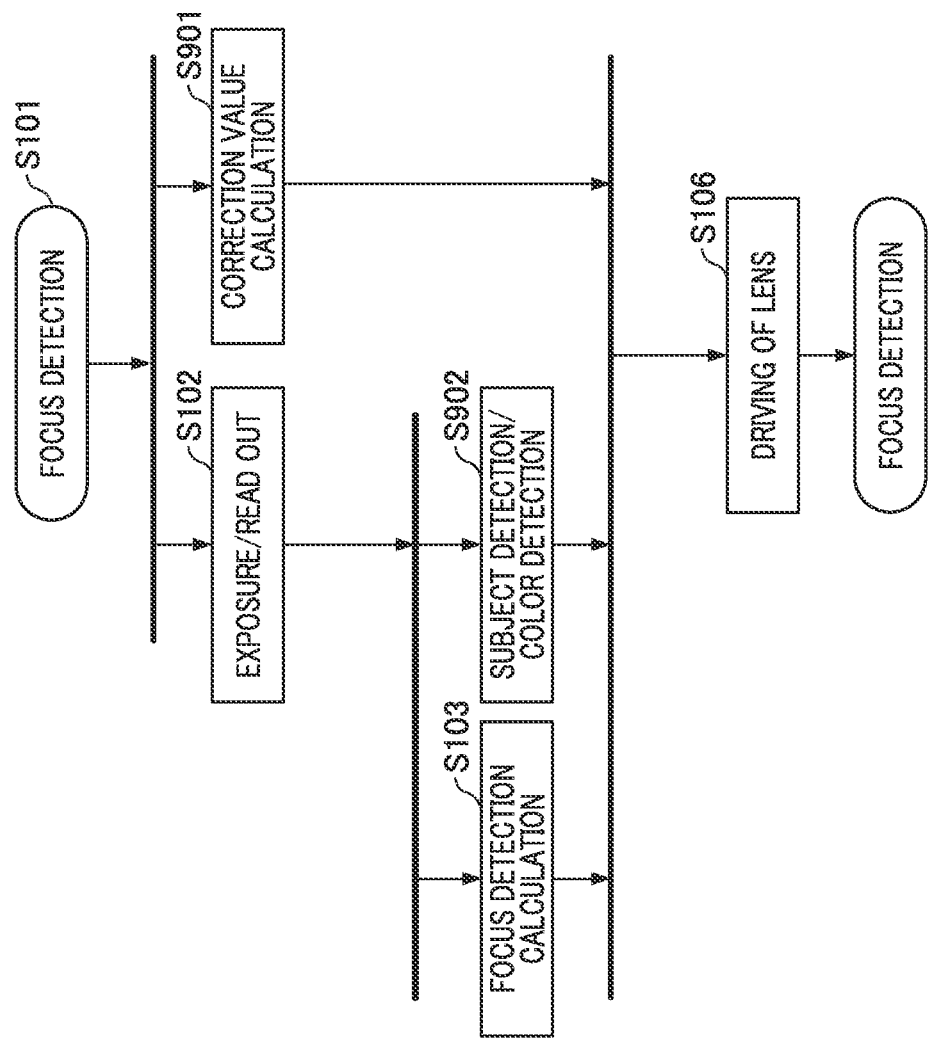

FIGS. 13A and 13B are flowcharts of focus detection according to Embodiment 2.

FIG. 13A is a rough flowchart.

The parts common to FIG. 7 will be omitted from the explanation. After performing exposure/read-out in step S102, a focus detection calculation in step S103 and detection/color detection of the subject in step S902 are performed in parallel. Next, in parallel with the operations in steps S102, S103, and S902, the correction value is calculated in step S901.

FIG. 13B is a flowchart showing the correction value calculation processing in step S901 in detail. In step S108, the lens status information is acquired, and the steps up to the step of acquiring the lens aberration information in step S109 are the same as for FIG. 8. In step S903, the color information of the subject is acquired. However, what is acquired this time uses the color information already acquired in the previous frame. Here, step S903 functions as a color information acquisition unit configured to acquire color information of a subject in a focus detection region of a frame preceding a predetermined frame for performing focus detection.

That is, in contrast to detecting the color information in the image of the frame in which focus detection is being attempted in Embodiment 1, in Embodiment 2, the color information of the previous frame is used. This is because, for example, when automatically detecting a subject and detecting the focus of the subject position, even if the focus detection position (subject position) significantly moves, the possibility that color information detected from the subject becomes the same is extremely high.

In step S904, a correction value based on the color information of the subject is calculated, but the point of difference is that the color information in this case is the color information of a region where the subject is detected in the previous frame. Here, step S904 functions as a third correction value calculation unit configured to calculate a third correction value configured to correct a focus position based on the aberration information and the color information of the previous frame. Further, step S106 functions as a correction unit configured to correct the focus position by using the third correction value.

Figure 14:
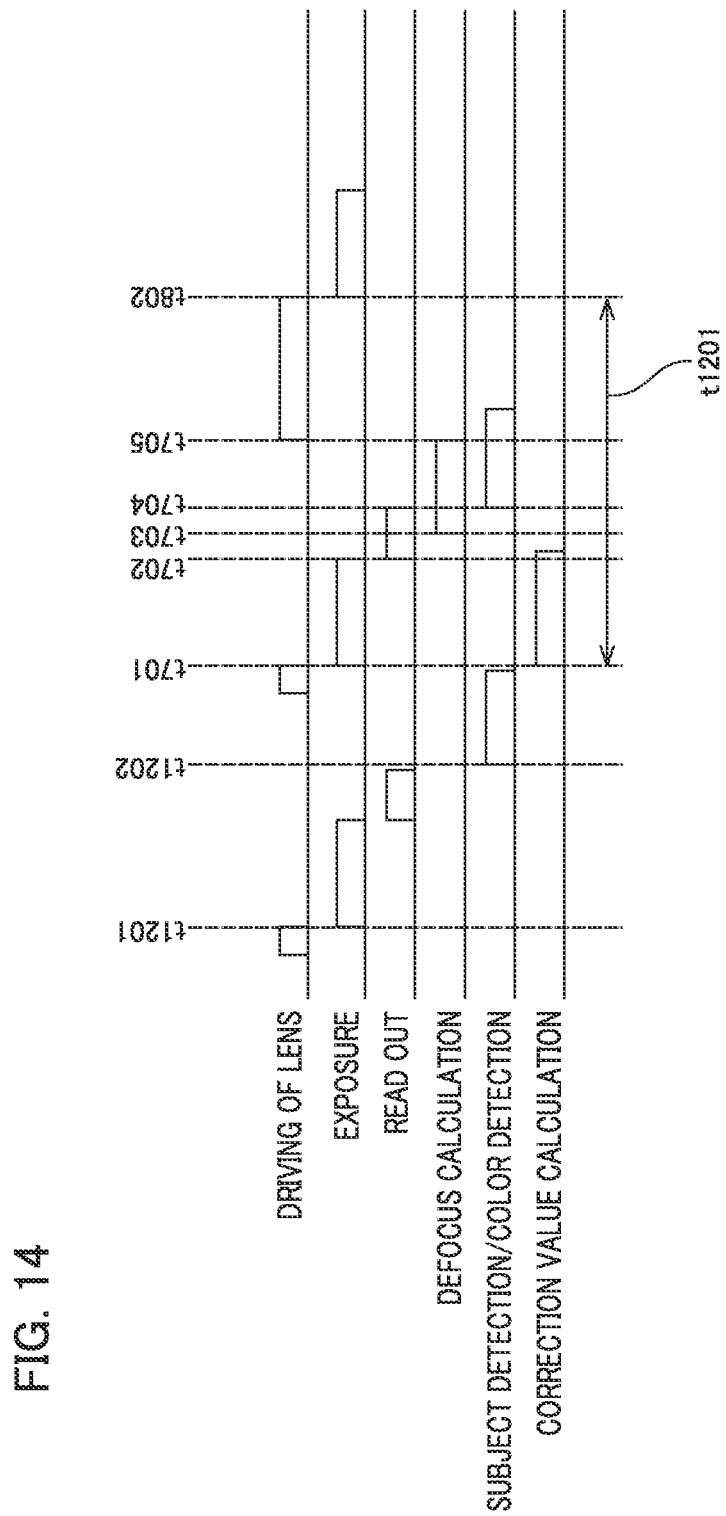
FIG. 14 is a timing chart of an image capturing apparatus according to Embodiment 2.

FIG. 14 is a timing chart of an image capturing apparatus according to Embodiment 2. At timing t1201, exposure is started and the exposure result is read out, and at timing t1202, subject detection and color detection are performed. In addition, at timing 1701, a correction value calculation is started in synchronization with the start of the next exposure operation. That is, in the present embodiment, the focus position detection unit detects a focus position based on an image of a predetermined frame of timing t701 to timing t702, and the color information acquisition unit acquires the color information from an image of a frame of timing t1201 to timing t1202 preceding the predetermined frame. As a result, the second correction calculation of Embodiment 1 is also not required, and the release time lag t1201 is shorter than that of 803 in Embodiment 1. Note that color information may be acquired from a frame preceding a predetermined frame by two or more frames.

The above is an explanation of a preferred embodiment of the present invention, but the focus detection method can be performed in the same manner as in the contrast AF method. In addition, instead of obtaining both an A signal and a B signal by providing two photoelectric conversion units in each pixel as shown in FIG. 2, a parallax image may be acquired by shielding one photoelectric conversion unit of FIG. 2 and arranging a plurality of pixels for obtaining only the A signal and pixels for obtaining only the B signal in the image capturing screen.

In addition, although an image sensor combined with an RGB color filter is used, the color filter may include a complementary color filter. In Embodiment 2, color information acquired in the one preceding frame is used. However, if the same subject is being detected, color information acquired from the information several frames preceding may be used.

In addition, because an operation is also possible to simultaneously detect a plurality of secondary subjects to be candidates other than the main subject, and to switch a secondary subject to the main subject based on the final defocus information, it is desirable that color information is acquired and held even for a secondary subject. In addition, the color information may be used as color information immediately before parallax image exposure by dividing the entire screen into a plurality of regions in a mesh shape to acquire and store color information representative of a plurality of regions While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the image capturing apparatus through a network or various storage media. Next, a computer (or a CPU, an MPU, or the like) of the image capturing apparatus may be configured to read and execute the program. In such a case, the program and the storage medium storing the program configure the present invention.

This application claims the benefit of Japanese Patent Application No. 2021-032978 filed on Mar. 2, 2021, which is hereby incorporated by reference herein in its entirety.

What is claimed is:

1. An image capturing apparatus configured to include at least one processor or circuit configured to function as:
a focus position detection unit configured to calculate a focus position by using an image via an image capturing optical system,
an aberration information acquisition unit configured to acquire aberration information of the image capturing optical system,
a color information acquisition unit configured to acquire color information of a subject in a focus detection region,
a first correction value calculation unit configured to calculate a first correction value for correcting the focus position based on the aberration information,
a second correction value calculation unit configured to calculate a second correction value for correcting the focus position based on the first correction value and the color information; and
a correction unit configured to correct the focus position by using the second correction value.

2. The image capturing apparatus according to claim 1, wherein a calculation by the first correction value calculation unit starts before the color information is acquired by the color information acquisition unit.

3. The image capturing apparatus according to claim 1, wherein the first correction value calculation unit is further configured to switch whether or not to perform a calculation of the first correction value for each color in accordance with the aberration information acquired by the aberration information acquisition unit.

4. The image capturing apparatus according to claim 1, wherein the second correction value calculation unit is further configured to switch whether or not to perform a calculation of the second correction value in accordance with the aberration information acquired by the aberration information acquisition unit.

5. The image capturing apparatus according to claim 1, wherein the focus position detection unit detects the focus position based on the image of the frame after the end of the exposure of the image of a predetermined frame, and the first correction value calculation unit calculates the first correction value during exposure of the image of the predetermined frame.

6. An image capturing apparatus configured to include at least one processor or circuit configured to function as:
a focus position detection unit configured to calculate a focus position by using an image of a predetermined frame via an image capturing optical system,
an aberration acquisition unit configured to acquire aberration information of the image capturing optical system,
a color information acquisition unit configured to acquire color information of a subject in a focus detection region of a frame preceding the predetermined frame,
a third correction value unit configured to calculate a third correction value for correcting the focus position based on the aberration information and the color information; and
a correction unit configured to correct the focus position by using the third correction value.

7. The image capturing apparatus according to claim 6, wherein the focus detection region is set by automatically detecting a subject.

8. The image capturing apparatus according to claim 6, wherein the color information acquisition unit divides the image into a plurality of regions and acquires the color information of each of the plurality of regions.

9. A non-transitory computer-readable storage medium configured to store a computer program to control an image capturing apparatus configured to have:
a focus position detection unit configured to calculate a focus position by using an image via an image capturing optical system,
an aberration information acquisition unit configured to acquire aberration information of the image capturing optical system,
a color information acquisition unit configured to acquire color information of a subject in a focus detection region,
a first correction value calculation unit configured to calculate a first correction value for correcting the focus position based on the aberration information,
a second correction value calculation unit configured to calculate a second correction value for correcting the focus position based on the first correction value and the color information; and
a correction unit configured to correct the focus position by using the second correction value.

10. An image capturing method comprising:
a focus position detection step of calculating a focus position by using an image via an image capturing optical system,
an aberration information acquisition step of acquiring aberration information of the image capturing optical system,
a color information acquisition step of acquiring color information of a subject in a focus detection region,
a first correction value calculation step of calculating a first correction value for correcting the focus position based on the aberration information,
a second correction value calculation step of calculating a second correction value for correcting the focus position based on the first correction value and the color information; and
a correction step of correcting the focus position by using the second correction value.

* * * * *